United States Patent [19]

Kakuishi et al.

[11] Patent Number: 4,786,557
[45] Date of Patent: Nov. 22, 1988

[54] MAGNETIC RECORDING MEDIUM OF CONTINUOUS FORM

[75] Inventors: Yutaka Kakuishi; Takahito Miyoshi; Masatoshi Takahashi, all of Kanagawa, Japan

[73] Assignee: Fuji Photo Film Co., Ltd., Kanagawa, Japan

[21] Appl. No.: 39,867

[22] Filed: Apr. 20, 1987

[30] Foreign Application Priority Data

Apr. 19, 1986 [JP] Japan .................................. 61-90610

[51] Int. Cl.$^4$ ............................................. G11B 5/702
[52] U.S. Cl. ................................... 428/418; 427/128; 427/131; 428/413; 428/425.9; 428/522; 428/694; 428/695; 428/900
[58] Field of Search ............ 428/694, 695, 522, 425.9, 428/900, 413, 418; 427/128, 131; 360/134–136

[56] References Cited

U.S. PATENT DOCUMENTS

| | | | |
|---|---|---|---|
| 4,407,901 | 10/1983 | Miyatsuka | 428/694 |
| 4,521,486 | 6/1985 | Nimomiya | 428/900 |
| 4,594,124 | 6/1986 | Nakayama | 428/694 |
| 4,600,521 | 7/1986 | Nakamura | 428/694 |
| 4,612,244 | 9/1986 | Kaneda | 428/425.9 |
| 4,615,949 | 10/1986 | Yoda | 428/900 |
| 4,634,633 | 1/1987 | Ninomiya | 428/900 |
| 4,637,959 | 1/1987 | Ninomiya | 428/900 |
| 4,643,934 | 2/1987 | Kajimoto | 428/900 |
| 4,659,626 | 4/1987 | Fukushima | 428/522 |

*Primary Examiner*—Ellis P. Robinson
*Attorney, Agent, or Firm*—Sughrue, Mion, Zinn, Macpeak, and Seas

[57] ABSTRACT

An improvement of a magnetic recording medium in the continuous form comprising a nonmagnetic support, a magnetic recording layer provided on one surface of the support, and a back layer provided on the other surface of the support comprising a binder and nonmagnetic particles dispersed therein. The improvement resides in that the binder of the back layer mainly contains:

a polyurethane resin containing a repeating unit having at least one polar group selected from the group consisting of —$SO_3M$, —$OSO_3M$, —COOM and —$PO(PM')_2$, wherein M is hydrogen or an alkali metal atom, and M' is hydrogen, an alkali metal atom or a lower hydrocarbon group; and a vinyl chloride copolymer containing a repeating unit having at least one polar group selected from the group consisting of —$SO_3M$, —$OSO_3M$, —COOM and —$PO(OM')_2$, wherein M and M' have the same meanings as defined above.

7 Claims, No Drawings

MAGNETIC RECORDING MEDIUM OF CONTINUOUS FORM

BACKGROUND OF THE INVENTION

1. Field of the Invention

The present invention relates to a magnetic recording medium in the continuous form which is provided with a back layer.

2. Description of Prior Art

A magnetic recording medium is widely used for recording electromagnetic signals, and various forms such as forms of tape, disc or card are appropriately applied to the medium according to the purpose. A magnetic recording medium in the form of tape (or in the continuous form; also referred hereinafter to simply as "magnetic tape") is employed as an audio tape, a video tape or a recording medium in a computer system.

Among the magnetic tapes, an audio tape or a video tape has been widely used as a tape encased in a cassette. Recently, the demand for long-play recording has increased with respect to the magnetic tape encased in a cassette, and hence a thinner magnetic tape has been employed in order to encase a magnetic tape having much longer length in the standard cassette.

For imparting high mechanical or physical strength to such thin magnetic tape and further accomplishing smooth contact between the back surface of the magnetic tape and the running system of a recording and reproducing device so as to ensure high running properties (i.e., smooth running), a magnetic tape provided with a back layer (or backing layer) on the surface of the nonmagnetic support not facing the magnetic recording layer has been developed and utilized.

The back layer generally comprises a binder and nonmagnetic particles dispersed therein. The back layer is required to have moderately protruded and depressed portions on its surface to enhance running properties of the magnetic tape. When the surface of the back layer is excessively smooth, the area on the surface of the back layer which is in contact with the running system increases to raise the friction coefficient on the surface of the back layer, whereby the running properties of the magnetic tape deteriorate. On the contrary, if excessively protruded and depressed portions are given on the surface of the back layer, the protruded and depressed portions are liable to be transferred onto the magnetic recording layer which is in contact with those portions in the preparation of a magnetic tape, especially when the tape kept in the wound state is subjected to a heat treatment. That is, protrusion and depression are copied on the surface of the magnetic recording layer, and hence the resulting magnetic tape deteriorates in electromagnetic conversion characteristics. Accordingly, it is required that not only is the particle size distribution of the nonmagnetic particles appropriately adjusted but also dispersibility of the nonmagnetic particles in the binder is improved in the preparation of a back layer.

For these reasons, studies have been made concerning influences of the binder on a surface of the back layer, etc. For instance, Japanese Patent Provisional Publication No. 56(1981)-98719 proposes to use a combination of a cellulosic resin, thermoplastic polyurethane elastomer and polyisocyanate as a preferred binder employable for the preparation of a back layer.

While such binder is satisfactory from the viewpoint of a function of the back layer, a careful attention is required to be paid in the preparation of a back layer using such binder, because nitrocellulose, which is a representative cellulosic resin, has an explosive nature, depending upon the treating conditions.

Otherwise, there can be employed a combination of a conventional polyurethane resin and a vinyl chloride resin as the binder, and in this case the employment of nitrocellulose can be avoided. However, since the nonmagnetic particles are poorly dispersed in such binder, the surface of the back layer obtained is likely provided with excessively protruded and depressed portions. Hence the obtained magnetic tape still easily deteriorates in the electromagnetic conversion characteristics. Further, the back layer prepared using the above-mentioned binder has poor mechanical or physical strength, and hence cracks are easily produced on the surface of the back layer, or an edge portion thereof is easily broken.

SUMMARY OF THE INVENTION

It is an object of the present invention to provide a magnetic recording medium the the continuous form having a back layer, which is improved in both running properties and electromagnetic conversion characteristics.

It is another object of the invention to provide a binder composition for forming a back layer which is advantageously employed in the preparation of a back layer having the aforementioned favorable features.

There is provided by the present invention a magnetic recording medium in the continuous form comprising a nonmagnetic support, a magnetic recording layer provided on one surface of the support, and a back layer provided on the other surface of the support comprising a binder and nonmagnetic particles dispersed therein, wherein the binder of the back layer contains as principal ingredient:

a polyurethane resin containing a repeating unit having at least one polar group selected from the group consisting of $-SO_3M$, $-OSO_3M$, $-COOM$ and $-PO(OM')_2$, wherein M is hydrogen or an alkali metal atom, and M' is hydrogen, an alkali metal atom or a lower hydrocarbon group; and a vinyl chloride copolymer containing a repeating unit having at least one polar group selected from the group consisting of $-SO_3M$, $-OSO_3M$, $-COOM$ and $-PO(OM')_2$, wherein M and M' have the same meanings as defined above.

It is preferred that the above-mentioned vinyl chloride copolymer further contains a repeating unit having an epoxy group in addition to the repeating unit having the specific polar group.

DETAILED DESCRIPTION OF THE INVENTION

A magnetic recording medium in the continuous form comprising a magnetic recording layer provided on one surface of a nonmagnetic support, namely a magnetic tape, has been already known, and the known materials and shapes thereof can be utilized in the preparation of the magnetic recording medium in the continuous form according to the present invention.

For instance, a plastic support is generally employed as the nonmagnetic support. The magnetic recording layer comprises a binder and a ferromagnetic powder dispersed therein.

As a ferromagnetic powder employable in the invention, there can be mentioned γ-iron oxide type ferromagnetic powder, Co-containing γ-iron oxide type ferromagnetic powder, ferromagnetic metal powder (host components: iron, nickel and cobalt), barium ferrite, and strontium ferrite. The magnetic recording layer may be a metal thin film comprising a ferromagnetic metal powder. The magnetic recording layer may further contain various additives, if desired.

The magnetic recording medium (magnetic tape) in the continuous form according to the invention is characterized in the structure of the back layer, so that the structure of the back layer will be mainly described hereinafter.

In the magnetic tape of the invention, the back layer comprises a specific binder and nonmagnetic particles dispersed therein.

As the nonmagnetic particles, there can be mentioned those generally employed as a filter for a conventional back layer.

Examples of the nonmagnetic particles include carbon black, graphite and an inorganic filler. They can be employed singly or in combination.

Examples of the inorganic filler include $TiO_2$, $TiO$, $ZnO$, $CaO$, $SnO_2$, $SiO$, $SiO_2$, $\alpha\text{-}Fe_2O_3$, $Cr_2O_3$, $\alpha\text{-}Al_2O_3$, $ZnS$, $MoS_2$, $BaSO_4$, $CaSO_4$, $MgCO_3$, $BN$ and $SiC$. Preferably used are carbon black, graphite, $ZnO$, $TiO_2$, $BaSO_4$ and $CaSO_4$.

There is no specific limitation on the particle size of the nonmagnetic particles or the shape thereof employable in the invention, and those conventionally employed can be utilized in the invention.

For instance, in the case of using carbon black, the mean particle size thereof is preferably in the range of 10 to 300 μm. In the case of using the inorganic filler, the mean particle size thereof is preferably in the range of 0.1 to 10 μm.

As for the shape of the nonmagnetic particles, various shapes such as sphere shape, needle shape, plate shape or dice shape can be employed in the invention.

The nonmagnetic particles are generally contained in the back layer in an amount of 25 to 500 parts by weight, preferably 50 to 300 parts by weight, based on 100 parts by weight of the binder contained in the back layer.

If the ratio of the nonmagnetic particles to the binder is too high, the nonmagnetic particles are liable to drop off from the back layer. On the contrary, if the ratio of the nonmagnetic particles to the binder is too low, the friction coefficient on the surface of the back layer tends to increase, and in the excessive case, the obtained layer does not effectively serve as the backing layer.

The nonmagnetic particles are dispersed in a binder to form a back layer.

The binder in the back layer of the magnetic tape according to the invention mainly comprises a polyurethane resin containing a repeating unit having a specific polar group and a vinyl chloride copolymer containing a repeating unit having a specific polar group.

The vinyl chloride copolymer generally contains a vinyl chloride repeating unit and a repeating unit having a specific polar group.

The repeating unit having a polar group included in the vinyl chloride copolymer has at least one polar group selected from the group consisting of $-SO_3M$, $-OSO_3M$, $-COOM$ and $-PO(OM')_2$, in which M and M' have the same meanings as defined hereinbefore.

These polar groups may be contained in the vinyl chloride copolymer singly or in combination.

Preferably employed is a vinyl chloride copolymer containing a repeating unit having $-SO_3Na$ and/or a repeating unit having $-COOH$.

The above-mentioned repeating unit having the specific polar group is generally contained in the vinyl chloride copolymer in an amount of 0.001 to 5.0 mol %, and preferably 0.05 to 3.0 mol %. When the amount of the repeating unit having the polar group is less than 0.001 mol %, the nonmagnetic particles are liable to be poorly dispersed, whereby the resulting back layer sometimes has a rough surface. When the amount of the repeating unit exceeds 5.0 mol %, the vinyl chloride copolymer becomes hygroscopic, whereby the resulting magnetic recording tape decreases in the weathering resistance.

Preferably, the above-mentioned vinyl chloride copolymer further contains a repeating unit having an epoxy group. In this case, the repeating unit having an epoxy groups is generally contained in the vinyl chloride copolymer is an amount of 1 to 30 mol %.

Further, the repeating unit having an epoxy group is preferably contained in the copolymer in an amount of 0.01 to 0.5 mol, and more preferably 0.01 to 0.3 mol, per one mol of the vinyl chloride repeating unit composing the vinyl chloride copolymer.

The epoxy group contained in the vinyl chloride copolymer serves to stabilize the copolymer and restrain a dehydrochlorination reaction which is progressive with time in the copolymer. Accordingly, when the amount of the repeating using having an epoxy group is much less than the lowest limit of the above-defined range, a hydrochloric acid gas is not effectively prevented from releasing from the vinyl chloride copolymer. When the amount thereof exceeds the upper limit, the vinyl chloride copolymer is apt to lower in hardness, whereby the resulting back layer decreases in running endurance.

The above-described vinyl chloride copolymer generally has a number-avergae molecular weight ranging from 10,000 to 100,000, and preferably from 15,000 to 60,000.

The vinyl chloride copolymer having the above mentioned specific polar group can be prepared by copolymerizing a vinyl chloride monomer with a monomer having a specific polar group and a reactive double bond according to a known process.

Examples of the monomer having a reactive double bond and a polar group employable for introducing a polar group into a vinyl chloride copolymer include 2-(meth)acrylamide-2-methylpropanesulfonic acid, vinyl sulfonic acid, sodium salt or potassium salt thereof, (meth)acrylic acid-ethyl 2-sulfonate, sodium salt or potassium salt thereof, maleic anhydride, (meth)acrylic acid, and (meth)acrylic acid-2-phosphoric acid ester.

In the case of introducing the epoxy group into the vinyl chloride copolymer, glycidyl (meth)acrylate is generally employed as a monomer having a reactive double bond and an epoxy group.

Methods other than the method as given above can also be utilized for incorporating a polar group into a vinyl chloride copolymer. For instance, a vinyl chloride copolymer having a hydroxyl group is initially prepared, and thus prepared copolymer is caused to react with a compound containing a polar group and a chlorine atom (e.g., monochloroacetic acid, or epichlorohydrin for incorporating an epoxy group) through dehydrochlorination reaction to incorporate the polar group into the copolymer.

In the preparation of a vinyl chloride copolymer employable in the invention, other monomers such as vinyl ethers, α-monoolefins, acrylic acid esters, unsaturated nitrile, aromatic vinyl and vinyl esters may be also contained so as to denature the resulting vinyl chloride copolymer. In the case of using those monomers, the amount thereof in the vinyl chloride copolymer is generally not larger than 20 mol %.

The methods for incorporating a polar group into a vinyl chloride copolymer is described, for instance, in Japanese Patent Provisional Publications Nos. 57(1982)-44227, 58(1983)-108032, 59 (1984)-8127 and 60(1985)-101161, and those methods can be also utilized in the present invention.

The polyurethane resin employable in the invention contains a repeating unit having a specific polar group. The repeating unit having the polar group composing the polyurethane resin has at least one group selected from the group consisting of —SO$_3$M, —OSO$_3$M, —COOM and —PO(OM')$_2$, in which M and M' have the same meanings as defined hereinbefore. These polar groups may be contained in the polyurethane resin singly or in combination.

Preferably employed is a polyurethane resin containing a repeating unit having —SO$_3$Na and/or a repeating unit having —COOH.

The repeating unit having the specific polar group is contained in the polyurethane resin in an amount of generally 0.001 to 5.0 mol %, preferably 0.01 to 2.0 mol %. If the amount of the repeating unit having the specific polar group is less than 0.001 mol %, the nonmagnetic particles are liable to be poorly dispersed. If the amount thereof exceeds 5.0 mol %, the polyurethane resin becomes hygroscopic, whereby the resulting magnetic tape decreases in weathering resistance.

The polyurethane resin having such repeating unit can be prepared, for instance, by the following process.

A polyurethane resin is generally produced by reaction of a polyisocyanate compound with a polyol component. As the polyol component, there is generally used polyester polyol which is produced by a reaction of polyol with a polybasic acid.

The above-described conventional process can be applied to the preparation of a polyurethane resin employable in the invention. In more detail, a polybasic acid having a polar group as a portion of the polybasic acid or polyol having a polar group is used to produce a polyester polyol, and thus obtained polyester polyol is caused to react with a polyisocyanate compound to produce a polyurethane resin.

Examples of the polybasic acid having a polar group or the polyol having a polar group include 5-sulfoisophthalic acid, 2-sulfoisophthalic acid, 4-sulfophthalic acid, 3-sulfophthalic acid, dialkyl 5-sulfoisophthalate, dialkyl 2-sulfoisophthalate, alkyl 4-sulfophthalate, alkyl 3-sulfophthalate, sodium salts thereof, potassium salts thereof, dimethylolpropionic acid, sodium salts thereof, and potassium salts thereof.

The above-mentioned reaction is already known, and the polyurethane resin employable in the invention can be prepared utilizing the known reaction.

Examples of the polyol component not having a polar group employable in the preparation of polyester polyol include trimethylolpropane, hexanetriol, glycerol, trimethylolethane, neopentyl glycol, pentaerythritol, ethylene glycol, propylene glycol, butylene glycol and diethylene glycol. Examples of the polybasic acids not having a polar group include phthalic acid, isophthalic acid, terephthalic acid, adipic acid, dimerized linolenic acid, sebacic acid, and maleic acid.

The polyester polyol having a specific polar group obtained as above generally has a number-average molecular weight ranging from 500 to 8,000.

Examples of the polyisocyanate compound include a reaction product of 3 moles of diisocyanate (e.g., diphenylmethane-4,4'-diisocyanate, tolylene diisocyanate, or xylylene diisocyanate) and 1 mol of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, and a polymer of diphenylmethane diisocyanate.

The reaction conditions are determined in such a manner that a number-average molecular weight of the polyurethane resin generally would be in the range of 10,000-200,000, and preferably 15,000-60,000.

Methods for incorporating a polar group into the polyurethane resin employable in the invention are by no means restricted to the above-described one, and other methods can be also employed. For instance, a polyurethane resin incorporated with a polyfunctional base, —OH, is first produced, and the polyurethane resin is caused to react with a compound containing a polar group and a chlorine atom (e.g., monochloroacetic acid) through dehydrochlorination reaction so as to incorporate a polar group into the polyurethane resin.

Methods for the incorporation of a polar group into a polyurethane resin are described, for instance, in Japanese Patent Publications Nos. 54(1979)-157603 and 58(1983)-41565, and Japanese Patent Provisional Publications Nos. 57(1982)-92422 and 57(1982)-92423, and those methods can also be utilized in the present invention.

A combination of the above-mentioned vinyl chloride copolymer and polyurethane resin is employed as a binder for a back layer of the recording medium of the present invention. The ratio between the vinyl chloride copolymer and the polyurethane resin is generally in the range of from 35:65 to 80:20 (vinyl chloride copolymer: polyurethane resin), and preferably in the range of from 40:60 to 70:30, by weight.

The back layer according to the invention may contain other resins generally used as a binder for a conventional back layer in addition to the above-mentioned vinyl chloride copolymer and polyurethane resin. Those other resins can be contained in the back layer in an amount of not larger than 20 wt. % of the whole amount of the binder.

A polyisocyanate compound is preferably employed in the preparation of a back layer of the magnetic tape according to the invention. In the case of using the polyisocyanate compound, the same kind of polyisocyanate compound as used in the preparation of the polyurethane resin can be employed. The polyisocyanate compound is generally contained in the back layer in the same amount or not larger than that of the polyurethane resin.

When the above-mentioned polyurethane resin, vinyl chloride copolymer and polyisocyanate compound are employed in combination, the polyisocyanate compound serves to form a three-dimensional crosslinking structure between the polyurethane resin and the vinyl chloride copolymer, whereby a binder of high strength can be prepared. Particularly, the specific polar ground incorporated into the polyurethane resin and the vinyl chloride copolymer easily react with the polyisocyanate compound, and the polyisocyanate compound serves to form a crosslinking structure in such a manner that the polar groups are bonded to each other, whereby a binder having much higher strength can be prepared.

Methods for providing a back layer on the surface of the nonmagnetic support are already known, and the back layer of the present invention can be provided on the surface of the nonmagnetic support according to the known methods. For instance, nonmagnetic particles (carbon black and/or inorganic filler), resin component, and further other additives, if desired, are dispersed or dissolved in an organic solvent to prepare a coating solution (dispersion). The coating solution is applied onto the surface of the nonmagnetic support. The coated layer is subjected to a drying procedure to evaporate the solvent, and further a curing procedure to cure the resin component. Thus, a back layer is formed on the nonmagnetic support.

The thickness of the back layer is generally not larger than 3 $\mu$m. Especially when the thickness thereof is not larger than 1.5 $\mu$m (preferably in the range of 0.2 to 1.2 $\mu$m), the resulting magnetic tape is advantageously applied to a domestic audio tape or a domestic video tape. In the case of the domestic audio or video tape, the tape sometimes has an unfavorable behavior such as curling when the thickness of the back layer is larger than 1.5 $\mu$m.

Provision of the back layer on one surface of the nonmagnetic support can be made before or after the provision of the magnetic recording layer on the other surface thereof. Otherwise, the back layer and the magnetic recording layer can be provided simultaneously on each surface of the nonmagnetic support. The magnetic tape of the present invention is suitable for a domestic video tape or a domestic audio tape in which a back layer and a magnetic recording layer are simultaneously provided on each surface of the nonmagnetic support.

The back layer of the magnetic recording medium of the invention may contain a lubricant on its surface. For incorporating a lubricant into the surface of the back layer, there can be utilized various processes such as a process of dissolving or dispersing the lubricant in the coating solution for the back layer, a process comprising the steps of coating an organic solvent solution of the lubricant over a thin film (back layer) and drying the coated solution, and a process comprising the steps of coating an organic solvent solution of the lubricant over the surface of the magnetic recording layer and transferring the lubricant to the surface of the back layer in the winding procedure of the resulting tape.

Examples of the lubricant employable in the invention include higher fatty acid, metallic soap, higher fatty acid amide, higher fatty acid ester, mineral oil, fats and oils type organic compound, silicone oil, inorganic powder, plastic powder, $\alpha$-olefin polymers, fluorocarbons, and mixtures thereof. Preferably employed is a lubricant mainly containing higher fatty acid or higher fatty acid ester. As the preferred higher fatty acid or higher fatty acid ester, there can be mentioned those having carbon atoms of not less than 12. Particularly preferred are a fatty acid having 12-18 carbon atoms and an ester of such fatty acid and alcohol having 1-12 carbon atoms.

A combination of the aforementioned polyurethane resin and vinyl chloride copolymer, both having a specific polar group, which is employed as a binder for a back layer of the magnetic recording medium (magnetic tape) according to the invention shows excellent properties such as high hardness, sufficient elasticity and high strength, and further has high dispersing characteristics for homogeneously dispersing the nonmagnetic particles therein. Such excellent properties of the binder are almost equal to those of a conventional binder comprising a combination of a polyurethane resin and nitrocellulose. In addition, since nitrocellulose is not used in the preparation of the binder, the problem of the restriction on the preparation conditions avoided.

In the case that an epoxy group is introduced into the vinyl chloride copolymer as well as the polar group, the epoxy group functions to restrain a decomposition reaction of the vinyl chloride copolymer (i.e., reaction of releasing a hydrochloric gas), and hence metallic members equipped in a running device are effectively prevented from corrosion.

The above-mentioned favorable features will be described below in more detail.

By employing the above-mentioned combination of a vinyl chloride copolymer having a specific polar group and a polyurethane resin having a specific polar group, the polar groups in the copolymer and the resin serve to enhance the affinity for the employed nonmagnetic particles, and hence the nonmagnetic particles can be well dispersed in the resulting back layer, whereby the surface of the back layer is made to be free from excessively protruded portions which are conventionally formed by insufficiently dispersed nonmagnetic particles. Accordingly, even when the magnetic tape is subjected a winding procedure while the binders contained in the magnetic recording layer and the back layer are not completely cured and subjected to a heat-curing treatment, the surface of the magnetic recording layer hardly deteriorates in smoothness.

Further, agglomerates of the nonmagnetic particles are less produced in the back layer and each particle is firmly fixed in the back layer by the binder, so that the nonmagnetic particles hardly drop off from the back layer in the running procedure. Hence, the phenomenon of dropping signals (drop-outs) caused by adhering the dropped nonmagnetic particles to the surface of the magnetic recording layer hardly takes place in the reproducing procedure.

The present invention is further illustrated by the following examples. In those examples, the expression "part(s)" means "part(s) by weight", unless otherwise specified.

EXAMPLE 1

A magnetic paint having the following composition and a coating solution for a back layer having the following composition were simultaneously coated, respectively, on each surface of a polyethylene terephthalate sheet (nonmagnetic support) having thickness of 13 $\mu$m, to form a magnetic recording layer having thickness of 5.0 $\mu$m (in dry basis) on one surface of the polyethylene terephthalate sheet and a back layer having a thickness of 1.0 $\mu$m (in dry basis) on the other surface thereof.

| Composition of Magnetic Paint | |
|---|---|
| Co-containing γ-Fe$_2$O$_3$ (specific surface area: 40 m$^2$/g) | 100 parts |
| Vinyl chloride/vinyl acetate/maleic anhydride copolymer (400 × 110 A, available from Nippon Geon Co., Ltd.) | 12 parts |
| Polyurethane resin (N-2304, available from Nippon Polyurethane Co., Ltd.) | 12 parts |
| Polyisocyanate compound (Colonate L, available from Nippon Polyurethane Co., Ltd.) | 8 parts |
| α-Al$_2$O$_3$ | 5 parts |
| Carbon black (mean particle size: 0.04 μm) | 5 parts |
| Stearic acid | 2 parts |
| Butyl stearate | 2 parts |
| Toluene | 50 parts |
| Methyl ethyl ketone | 250 parts |

| Composition of Coating Solution for Back Layer | |
|---|---|
| Carbon black (trade name: Condatex SC, secondary mean particle size: 17 mμ) | 100 parts |
| Vinyl chloride copolymer (*1) | 100 parts |
| Polyurethane resin (*2) | 50 parts |
| Polyisocyanate compound (Colonate L, available from Nippon Polyurethane Co., Ltd..) | 50 parts |
| Stearic acid | 5 parts |
| Toluene | 50 parts |
| Methyl ethyl ketone | 700 parts |

The above-mentioned vinyl chloride copolymer (*1) and polyurethane resin (*2) in the coating solution for a back layer were prepared by the processes described below.

VINYL CHLORIDE COPOLYMER

Into a 500-ml stainless autoclave equipped with a magnetic induction stirrer and a pressure indicator were introduced 300 ml of nitrogen-substituted distilled water dissolving 0.6 g. of polyvinyl alcohol, 0.15 g. of azobisisobutyronitrile, 16.6 g. of glycidyl methacrylate and 8.0 g. of sodium 2-acrylamido-2-methylpropanesulfonate, and the autoclave is covered with a lid. The autoclave was then allowed to cool in a dry ice-methanol bath to lower a temperature within the autoclave to −20° C.

Subsequently, the autoclave was charged with nitrogen gas to substitute a gas in the autoclave by the nitrogen gas, and then rapidly introduced 100 g. of a cooled liquid vinyl chloride. The components in the autoclave were stirred for approx. 15 min. at elevating temperature inside the autoclave to 60° C. to perform a polymerization reaction.

All of the reactive components in the autoclave were consumed to lower the pressure inside the autoclave so as to complete the polymerization reaction.

After lowering of the pressure, the autoclave was cooled to room temperature, and nitrogen was introduced into the autoclave to remove the remaining vinyl chloride. The obtained product was taken out of the autoclave. The product was then sufficiently washed with water and filtered to obtain a white powder of the polymerization product. The polymerization product was then dried under vacuum at 40° C. for 12 hours.

As a result of elemental analysis, thus obtained product was confirmed to be a vinyl chloride copolymer in which vinyl chloride, sodium 2-acrylamido-2-methylpropanesulfonate and glycidyl methacrylate were polymerized in a molar ratio of 87.5:2.5:10 (vinyl chloride: sodium 2-acrylamido-2-methylpropanesulfonate:glycidyl methacrylate).

The obtained vinyl chloride copolymer was measured for its intrinsic viscosity [η] by the use of methyl ethyl ketone. The intrinsic viscosity thereof was 0.21.

POLYURETHANE RESIN

Into a reactor equipped with a thermometer, a stirrer and a partial reflux condenser were introduced 582 g. of dimethyl terephthalate, 157 g. of dimethyl 5-sodium sulfoisophthalate, 434 g. of ethylene glycol, 728 g. of neopentyl glycol, 0.66 g. of zinc acetate and 0.08 g. of sodium acetate, to perform a reaction at 220° C. for 2 hours. To the reaction product in the reactor was further added 1,212 g. of sebacic acid to carry out a reaction for 2 hours. Then the pressure of the reaction system was reduced to 20 mmHg for 30 min., and the polymerization reaction was carried out at a pressure of 5–20 mmHg and a temperature of 250° C. for 50 min. to produce polyester polyol.

In the obtained polyester polyol, terephthalic acid, dimethyl 5-sodium sulfoisophthalic acid, sebacic acid, ethylene glycol and neopentyl glycol bonded to each other in a molar ratio of 15.3:2.9:30.7:22.5:28.6 (terephthalic acid : dimethyl 5-sodium sulfoisophthalic acid : sebacic acid : ethylene glycol : neopentyl glycol).

Into the same reactor as described above were introduced 1,000 g. of the polyester polyol obtained above, 1,280 g. of toluene, 850 g. of methyl isobutyl ketone, 71 g. of diphenylmethane diisocyanate and 1.2 g. of dibutyl tin dilaurate, to perform a reaction at a temperature of 70°–90° C. for 8 hours so as to produce a polyurethane resin. In the obtained polyurethane resin, dimethyl 5-sodiumsulfoisophthalate was polymerized in an amount of 0.25 mol %.

The nonmagnetic support having the magnetic recording layer on one surface and the back layer on the other surface was subjected to a drying process and a surface smoothing process, and immediately wound up.

The resulting sheet was subjected to a heat-curing treatment at 60° C. for 72 hours in the wound state, and the sheet was then slit into a width of ½ inch to give a VHS type video tape.

The obtained video tape was measured on Y.S/N ratio of the magnetic recording layer and number of occurrence of drop-out in the last running of 500 times-running of the tape according to the following tests. The results are set forth in Table 1.

(1) Y.S/N ratio.

The measurement of S/N ratio was done with respect to the reproduced signals of the video tape by means of a noise meter (9Z5R, produced by Shibasoku Co., Ltd.). The S/N ratio is expressed by a relative value based on the S/N ratio of the video tape obtained in Comparison Example 1 being 0 dB. In the measurement, a high pass filter of 10 kHz, a low pass filter of 42 MHz, and a conventional video tape recorder were employed.

(2) Number of occurrences of drop-outs in the last running of 500 times-running

The video tape was run at 500 times, and in the last running the number of occurrence of drop-out in which the reproduction output was lowered by not less than 18 dB for not shorter than 15 μsec. was measured per one minute by means of a drop-out counter (VH01BZ, produced by Shibasoku Co., Ltd).

The video tape obtained in Example 1 was observed on the surface of the back layer by using a microscope after the tape was run at 500 times, and any crack was not found on the back layer. As a result, the obtained video tape was encased in a VHS type video cassette, and then allowed to stand at 60° C. and 90 %RH for one week in such conditions that the surface of the back layer was in contact with a stainless tape guide equipped in the cassette. Thereafter, the surface of the tape guide was examined on the occurrence of corrosion by using a microscope. As a result, no change (properties or color) was found on the surface of the tape guide.

EXAMPLE 2

The procedure of Example 1 was repeated except for using 8.3 g. of glycidyl methacrylate and 8.5 g. of vinyl acetate instead of 16.6 g. of glycidyl methacrylate, to prepare a vinyl chloride copolymer. In the obtained vinyl chloride copolymer, the copolymerization ratio among vinyl chloride, sodium 2-acrylamido-2-methyl-propanesulfonate, glycidyl methacrylate and vinyl acetate was 80:2.5:5:5 (vinyl chloride:sodium 2-acrylamido-2-methylpropanesulfonate:glycidyl methacrylate:vinyl acetate), by mol.

Using the vinyl chloride copolymer, a magnetic recording medium (video tape) was prepared in the same manner as described in Example 1.

The obtained video tape was measured on the Y.S/N ratio and the number of occurrences of drop-outs in the last running of 500 times-running according to the above-described tests. The results are set forth in Table 1.

The surface of the back layer was observed in the same manner as described in Example 1. As a result, any crack was not found on the back layer. Further, no change in the properties or color was observed on the surface of the tape guide.

EXAMPLE 3

The procedure of Example 1 was repeated except for using 3.5 g. of maleic anhydride instead of 8.0 g. of sodium 2-acrylamido-2-methylpropanesulfonate to prepare a vinyl chloride copolymer.

As a result of elemental analysis on the obtained copolymer, the copolymerization ratio among vinyl chloride, maleic anhydride and glycidyl methacrylate was 87.5:2.5:10 (vinyl chloride : maleic anhydride : glycidyl methacrylate), by mol.

Using the vinyl chloride copolymer, a magnetic recording medium (video tape) was prepared in the same manner as described in Example 1.

The obtained video tape was measured on the Y.S/N ratio and the number of occurrences of drop-outs in the last running of 500 times-running according to the above-described tests. The results are set forth in Table 1.

The surface of the back layer was observed in the same manner as described in Example 1. As a result, any crack was not found on the back layer. Further, no change in the properties or color was observed on the surface of the tape guide.

EXAMPLE 4

The procedure of Example 1 was repeated except for using 50 g. of mellitic anhydride instead of 157 g. of dimethyl 5-sodiumsulfoisophthalate to prepare a polyurethane resin.

Using the polyurethane resin, a mangetic recording medium (video tape) was prepared in the same manner as described in Example 1.

The obtained video tape was measured on the Y.S/N ratio and the number of occurences of drop-outs in the last running of 500 times-running according to the above-described tests. The results are set forth in Table 1.

The surface of the back layer was observed in the same manner as described in Example 1. As a result, any crack was not found on the back layer. Further, no change in the properties or color was observed on the surface of the tape guide.

EXAMPLES 5-7

The procedure of Example 1 was repeated except for using the following nonmagnetic particles in the same amount as that of carbon black employed in Example 1 instead of carbon black, to prepare VHS type video tapes:

Example 5: $TiO_2$ having mean particle size of 0.2 $\mu$m,

Example 6: $BaSO_4$ having mean particle size of 0.2 $\mu$m, and

Example 7: ZnO having mean particle size of 0.2 $\mu$m.

The obtained video tapes were measured on the Y.S/N ratio and the number of occurences of drop-outs in the last running of 500 times-running according to the above-described tests. The results are set forth in Table 1.

The surface of the back layer was observed in the same manner as described in Example 1. As a result, any crack was not found on the back layer. Further, no change in the properties or color was not observed on the surface of the tape guide.

COMPARISON EXAMPLE 1

The procedure of Example 1 was repeated except for using a polyurethane resin not having a polar group (N-2304, available from Nippon Polyurethane Co., Ltd.) in the same amount as that of the polyurethane resin (*2) employed in Example 1, instead of the polyurethane resin (*2), to prepare a VHS tape video tape.

The obtained video tape was measured on the Y.S/N ratio and the number of occurences of drop-outs in the last running of 500 times-running according to the above-described tests. The results are set forth in Table 1.

The surface of the back layer was observed in the same manner as described in Example 1. As a result, cracks were found on the edge portion of the back layer. However, no change in the properties or color was observed on the surface of the tape guide.

COMPARISON EXAMPLE 2

The procedure of Example 1 was repeated except for using a commercially available vinyl chloride/vinyl acetate/maleic anhydride copolymer not having —$SO_3Na$ and epoxy group (400x110A, available from Nippon Geon Co., Ltd.) instead of the vinyl chloride copolymer (*1), to prepare a VHS type video tape.

The obtained video tape was measured on the Y.S/N ratio and the number of occurences of drop-outs in the last running of 500 times-running according to the above-described tests. The results are set forth in Table 1.

The surface of the back layer was observed in the same manner as described in Example 1. As a result, cracks were found on the edge portion of the back layer. Further, color change (namely, fine brown spots) was observed on the surface of the tape guide.

REFERENCE EXAMPLE 1

The procedure of Example 1 was repeated except for using 100 parts by weight of nitrocellulose (nitration degree: 11.8%) instead of 100 parts by weight of the vinyl chloride copolymer (*1) and using 50 parts by weight of a polyurethane resin (N-2304, available from Nippon Polyurethane Co., Ltd.) instead of 50 parts by weight of the polyurethane resin (*2), to prepare a VHS type video tape.

The obtained video tape was measured on the Y.S/N ratio and the number of occurrences of drop-outs in the last running of 500 times-running according to the above-described tests. The results are set forth in Table 1.

TABLE 1

| | Y · S/N Ratio (dB) | Number of Occurences of Drop-outs (per min.) |
|---|---|---|
| Example 1 | +0.5 | 20 |
| Example 2 | +0.5 | 20 |
| Example 3 | +0.3 | 20 |
| Example 4 | +0.5 | 20 |
| Example 5 | +0.3 | 20 |
| Example 6 | +0.3 | 20 |
| Example 7 | +0.3 | 20 |
| Com. Example 1 | 0 | 50 |
| Com. Example 2 | −0.2 | 50 |
| Ref. Example 1 | +0.3 | 20 |

We claim:

1. In a magnetic recording medium in a continuous form comprising a nonmagnetic support, a magnetic recording layer provided on one surface of the support, and a back layer provided on the other surface of the support comprising a binder and nonmagnetic particles dispersed therein, the improvement wherein said binder contains as principal ingredients:

a polyurethane resin containing a repeating unit having at least one polar group selected from the group consisting of $-SO_3M$, $-OSO_3M$, $-COOM$ and $-PO(OM')_2$, wherein M is hydrogen or an alkali metal atom, and M' is hydrogen, an alkali metal atom or a lower hydrocarbon group, in an amount of 0.001–50 mol %; and a vinyl chloride copolymer containing a repeating unit having at least one polar group selected from the group consisting of $-SO_3M$, $-OSO_3M$, [$-COOM$] and $-PO(OM')_2$, wherein M and M' have the same meanings as defined above, in an amount of 0.001–5.0 mol %; and the ratio between the vinyl chloride copolymer and the polyurethane resin being in the range of from 35:65 to 80:20, by weight.

2. The magnetic recording medium as claimed in claim 1, wherein the ratio between the vinyl chloride copolymer and the polyurethane resin in said binder is in the range of from 40:60 to 70:30, by weight.

3. The magnetic recording medium as claimed in claim 1, wherein said binder is a cured mixture of the polyurethane resin, vinyl chloride copolymer and a polyisocyanate compound.

4. The magnetic recording medium as claimed in claim 1, wherein said back layer further contains a lubricant.

5. The magnetic recording medium as claimed in claim 1, wherein said vinyl chloride copolymer further contains a repeating unit having an epoxy group.

6. The magnetic recording medium as claimed in claim 1, wherein said vinyl chloride copolymer further contains a repeating unit having an epoxy group in an amount of 1–30 mol %.

7. The magnetic recording medium as claimed in claim 1, wherein said vinyl chloride copolymer further contains a repeating unit having an epoxy group in an amount of 0.01–0.5 mol based on 1 mol of a vinyl chloride repeating unit thereof.

* * * * *